United States Patent
Malo et al.

(10) Patent No.: US 8,872,431 B2
(45) Date of Patent: *Oct. 28, 2014

(54) DUAL LIGHT SENSORS ON A PORTABLE ELECTRONIC DEVICE

(71) Applicant: Research in Motion Limited, Waterloo (CA)

(72) Inventors: Eric Gary Malo, Waterloo (CA); Bergen Albert Fletcher, Waterloo (CA); Ken Wu, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,117

(22) Filed: Feb. 14, 2013

(65) Prior Publication Data

US 2013/0154485 A1 Jun. 20, 2013

Related U.S. Application Data

(63) Continuation of application No. 12/392,628, filed on Feb. 25, 2009, now Pat. No. 8,400,065.

(60) Provisional application No. 61/093,581, filed on Sep. 2, 2008.

(51) Int. Cl.
| | |
|---|---|
| *H05B 37/02* | (2006.01) |
| *H05B 37/00* | (2006.01) |
| *H04W 52/02* | (2009.01) |
| *G01J 1/02* | (2006.01) |
| *H04M 1/22* | (2006.01) |
| *H04M 1/02* | (2006.01) |

(52) U.S. Cl.
CPC ............... *G01J 1/0233* (2013.01); *H05B 37/00* (2013.01); *H04M 2250/12* (2013.01); *H04W 52/027* (2013.01); *H04M 1/22* (2013.01); *H04M 1/0214* (2013.01); *H04M 1/0245* (2013.01); *H04M 2250/16* (2013.01)
USPC ............................ 315/149; 315/156; 315/158

(58) Field of Classification Search
USPC ......... 315/149, 156, 158, 291, 307, 308, 309; 345/102, 156, 204
See application file for complete search history.

(56) References Cited

U.S. PATENT DOCUMENTS

| | | | | |
|---|---|---|---|---|
| 6,278,389 | B1 * | 8/2001 | Lochmann et al. | 341/118 |
| 2007/0075965 | A1 * | 4/2007 | Huppi et al. | 345/156 |

OTHER PUBLICATIONS

U.S. Appl. No. 12/392,628, filed Feb. 25, 2009, entitled: "Dual Light Sensors on a Portable Electronic Device".

* cited by examiner

*Primary Examiner* — Tung X Le
(74) *Attorney, Agent, or Firm* — Perry + Currier Inc.

(57) ABSTRACT

A portable electronic device capable of assuming an open configuration and a closed configuration comprises a primary light sensor and a secondary light sensor. When the portable electronic device is in the open configuration, a light sensor signal is selected from the primary light sensor, and when the portable electronic device is in the closed configuration, a light sensor signal is selected from the secondary light sensor.

20 Claims, 5 Drawing Sheets

US 8,872,431 B2

DUAL LIGHT SENSORS ON A PORTABLE ELECTRONIC DEVICE

CROSS-REFERENCE TO RELATED APPLICATION

The present application is a continuation of U.S. application Ser. No. 12/392,628, filed Feb. 25, 2009, which claims priority from U.S. Provisional Patent Application No. 61/093,581, filed Sep. 2, 2008.

TECHNICAL FIELD

The present disclosure relates generally to mobile electronic devices, and more particularly to mobile electronic devices that include light sensors.

BACKGROUND

Mobile electronic devices may have multiple screens or displays. An example of such devices is a clamshell mobile communication device, which generally has a base and a hinged or sliding lid that can be closed over the base. Such devices generally provide a user with a primary display inside the lid or on the base that is visible when the device is open and provides the user with a user interface. Furthermore, some clamshell devices have a secondary display on the outside of the lid that is visible when the device is closed and provides the user with a secondary user interface. The secondary user interface may provide the user with such information as the device status, or notifications such as missed calls, new messages, and the like.

DETAILED DESCRIPTION

According to an aspect of this specification, there is provided a portable electronic device comprising: a first casing; a second casing; a hinge assembly connecting the first casing to the second casing and enabling the device to alternate between an open configuration and a closed configuration; a primary display mounted in one of the first and second casings, wherein the primary display is visible when the device is in the open configuration and wherein the primary display is hidden when the device is in the closed configuration; a secondary display mounted in one of the first and second casings; a primary light sensor mounted in one of the first and second casings, wherein the primary light sensor is visible when the device is in the open configuration and wherein the primary light sensor is hidden when the device is in the closed configuration; a secondary light sensor mounted in one of the first and second casings; and a selector configured to select a light sensor signal from one of the primary light sensor and the secondary light sensor as a function of the configuration of the device.

According to another aspect, there is provided a method comprising: receiving a configuration signal generated as a function of the configuration of a portable electronic device, wherein the portable electronic device is enabled to alternate between an open configuration and a closed configuration; and selecting a light sensor signal from one of a primary light sensor and a secondary light sensor as a function of the configuration signal.

Figure 1:
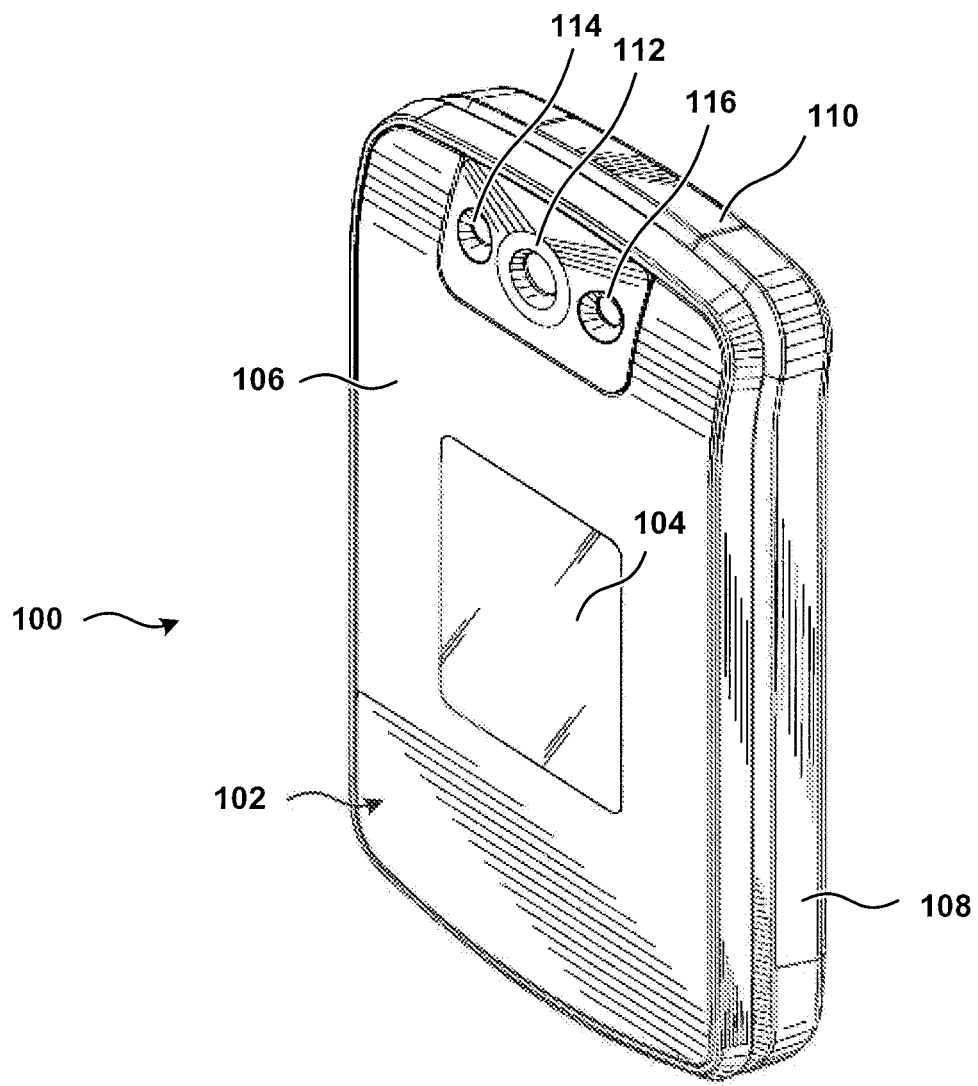
FIG. 1 is a perspective view of an illustrative mobile electronic device in a closed configuration.
Figure 2:
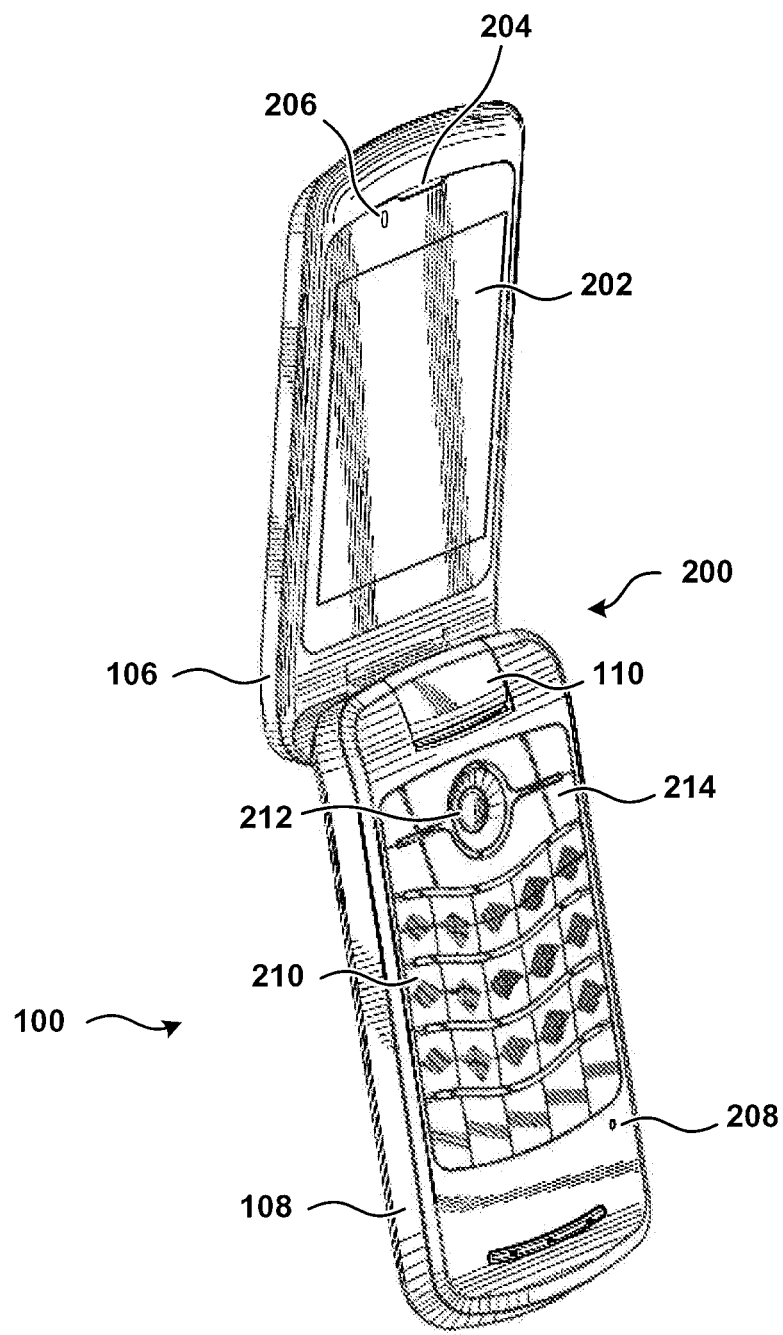
FIG. 2 is a perspective view of the illustrative mobile electronic device in an open configuration.

FIGS. 1 and 2 show a portable electronic device 100. In the illustrative embodiment depicted in FIGS. 1 and 2, the portable electronic device 100 is a foldable electronic device such as a clamshell mobile communication device that can assume a closed configuration and an open configuration. FIG. 1 depicts portable electronic device 100 in a closed configuration and FIG. 2 shows portable electronic device 100 in an open configuration. The portable electronic device 100 has an interior surface 200, which includes a primary display 202. When the portable electronic device 100 is in the closed configuration, the interior surface 200 in general and the primary display 202 in particular are hidden from a user. When the portable electronic device 100 is in the open configuration, the interior surface 200 is generally visible to a user. The portable electronic device 100 also has an exterior surface 102 having a secondary display 104.

When the portable electronic device 100 is in the open configuration, ordinarily the user's attention will be directed at the interior surface 200 and not at the exterior surface 102. When the portable electronic device 100 is in the closed configuration, the user's attention may be directed at the exterior surface 102, and not at the interior surface 200 since it will not be visible to the user. Accordingly, the primary display 202 is generally active when the portable electronic device 100 is in an open configuration and is generally inactive when the portable electronic device 100 is in the closed configuration, to save battery power. The secondary display 104 may be active or inactive when the portable electronic device 100 is in a closed configuration, but is generally inactive when the portable electronic device 100 is in the open configuration, to save battery power.

As depicted in the closed configuration shown in FIG. 1, the portable electronic device 100 includes an upper casing 106, which in the shown embodiment includes the secondary display 104. The portable electronic device 100 also includes a lower casing 108 attached to the upper casing 106 by a hinge assembly 110. In the embodiment shown in FIG. 1, the primary display 202 (not shown) and the secondary display 104 are mounted on opposite sides of the upper casing 106. The secondary display 104 may display any information, such as: a graphical user interface; an image such as a photograph; status information such as a battery status; an event notification such as a calendar appointment or an arrival of a new email or a "missed call" notification; a message such as a text message; or a video or animated presentation. In some implementations, the secondary display 104 is generally inactive but may become active upon the occurrence of a condition, such as the receipt of a text message or incoming call.

As shown in FIG. 1, the upper casing 106 also includes a camera lens 112 and a lamp 114 that can serve as a camera flash. Lamp 114 can be any of several lighting devices configured to generate light having an appropriate magnitude or lumen to increase the quality of the images that are obtained by the camera lens 112. Lamp 114 may include, for example, one or more light emitting diodes (LEDs).

Further, as shown in FIG. 1, the upper casing 106 includes a secondary light sensor 116 mounted therein. The secondary light sensor 116 can include any light-responsive photodetective electronic component, including but not limited to a light dependent resistor, a light-responsive transistor or a light-responsive diode. In FIG. 1, the lamp 114 and the secondary light sensor 116 are depicted as distinct elements, but in some embodiments, the lamp 114 and the secondary light sensor 116 may be a single element or include shared components.

Although not shown on FIG. 1, the exterior surface 102 may also include one or more user interface tools, such as a selection button, navigation button, trackwheel or trackball.

As depicted in the open configuration shown in FIG. 2, the upper casing 106 includes the primary display 202, a speaker 204 and a primary light sensor 206 mounted therein. The primary light sensor 206 can include any light-responsive photodetective electronic component. In the embodiment depicted in FIG. 2, the primary light sensor 206 can share a window in the upper casing with an LED such that the window serves as a visual indicator as well as a light sensor. The primary light sensor 206 is generally exposed to ambient light when the portable electronic device 100 is in the open configuration, and is generally hidden from ambient light when the portable electronic device 100 is in the closed configuration.

The lower casing 108 may include a microphone 208 and one or more user interface controls such as a keypad 210, a clickable trackball 212 or other device for navigation, and one or more input buttons 214, such as select, cancel, and/or talk buttons. Although not shown on FIG. 2, the upper casing 106 or the lower casing 108 may also include one or more additional user interface tools.

The primary display 202 may display any information. As depicted in FIGS. 1 and 2, the primary display 202 is larger than the secondary display 104, and in some embodiments, the primary display 202 may include features different from those in the secondary display 104, such as enhanced resolution or improved color.

Figure 3:
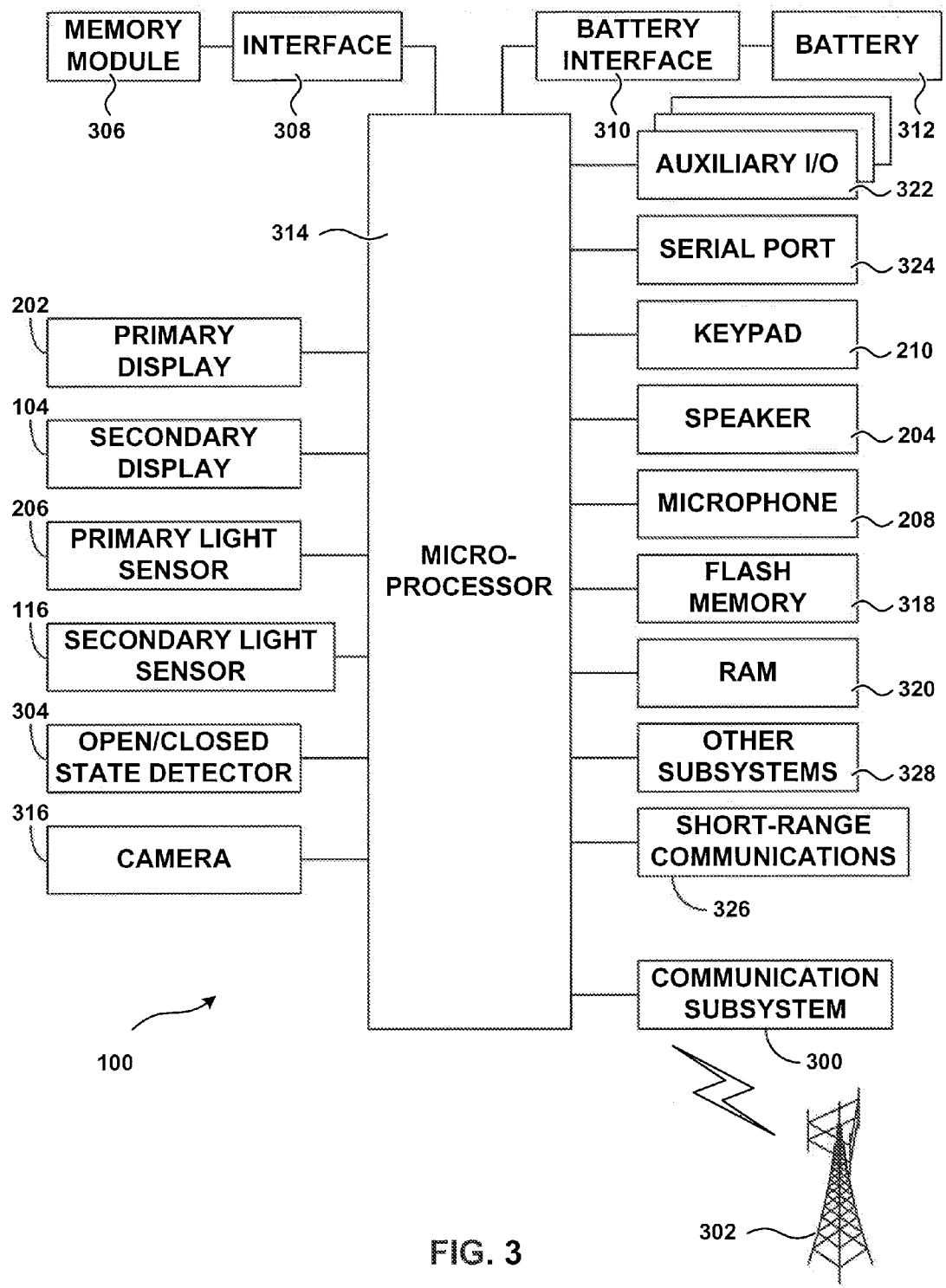
FIG. 3 is a block diagram illustrating the mobile electronic device in accordance with the present disclosure.

FIG. 3 shows a block diagram illustrating some of the components of the portable electronic device 100. In the embodiment depicted in FIG. 3, portable electronic device 100 is a two-way mobile communication device for data and voice communication, and includes a communication subsystem 300 configured to communicate wirelessly with a communications network 302. Communication subsystem 300 may include one or more receivers, transmitters, antennas, signal processors and other components associated with wireless communications. The particular design of the communication subsystem 300 depends on the network in which the portable electronic device 100 is intended to operate. The concepts herein may be applicable to a variety of portable electronic devices, such as data messaging devices, two-way pagers, cellular telephones with or without data messaging capabilities, wireless Internet appliances, data communication devices with or without telephony capabilities, a clamshell device, a slider phone or a flip-phone. The concepts described herein are not limited to devices having communications capability, however, and may be applied to portable electronic devices such as digital cameras that are not enabled for communications.

The portable electronic device 100 includes an open-closed state detector 304 (not shown in FIGS. 1 and 2), which detects whether the portable electronic device 100 is in the open configuration as opposed to the closed configuration, or detects whether the portable electronic device 100 has changed from one configuration to the other. The open-closed state detector is typically concealed within the upper casing 106 or the lower casing 108. In one non-limiting embodiment, the open-closed state detector is a Hall effect sensor mounted in one casing and is responsive to movement of a magnet in another casing. When the portable electronic device 100 is in the closed configuration, the Hall effect sensor is proximate to the magnet, and when the portable electronic device 100 is in the open configuration, the Hall effect sensor is distant from the magnet. The movement of the magnet toward or away from the Hall effect sensor generates a configuration signal, that is, a signal indicative of the portable electronic device 100 being in one configuration or another, or changing state from one configuration or another. In other embodiments, open-closed state detector 304 may be a mechanical switch or mechanical, electromagnetic or visual mechanism for detecting whether the portable electronic device 100 is in the open configuration as opposed to the closed configuration, or detecting whether the portable electronic device 100 has changed from one configuration to the other In the embodiment shown in FIG. 3, network access is associated with a subscriber or user of the portable electronic device 100 via a memory module 306, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 308 of the portable electronic device 100 to operate in conjunction with a wireless network. Alternatively, the portable electronic device 100 may have an integrated identity module for use with systems such as Code Division Multiple Access (CDMA) systems.

The portable electronic device 100 also includes a battery interface 310 for receiving one or more rechargeable batteries 312. The battery 312 provides electrical power to at least some of the electrical circuitry in the portable electronic device 100, and the battery interface 310 provides a mechanical and electrical connection for the battery 312.

The portable electronic device 100 includes a microprocessor 314 which controls the overall operation of the portable electronic device 100. Communication functions, including at least data and voice communications, are performed through the communication subsystem 300. The microprocessor 314 also interacts with additional device subsystems such as the primary display 202, the secondary display 104, the primary light sensor 206, the secondary light sensor 116 and the open-closed state detector 304.

The microprocessor 314 also interacts with a camera control module 316, flash memory 318, a random access memory (RAM) 320, auxiliary input/output (I/O) subsystems 322, a data port such as serial port 324, keypad 210, speaker 204, microphone 208, a short-range communications subsystem 326, and any other device subsystems generally designated as 328. The microprocessor may further interact with other components, which for simplicity are not shown in FIG. 3.

The microprocessor 314, in addition to its operating system functions, enables execution of software applications on the portable electronic device 100. Software, which may include operating system software or application software, may be stored in flash memory 318, RAM 320 or any other memory element. As will be discussed below, software may be stored on the portable electronic device 100 to select whether a light sensor signal generated by primary light sensor 206 or a light sensor signal generated by secondary light sensor 116 will be used to regulate primary display 202 or secondary display 104.

A predetermined set of applications that control basic device operations, including data and voice communication applications, will normally be installed on the portable electronic device 100 during or after manufacture. The portable electronic device 100 may include a personal information manager (PIM) application having the ability to organize and manage data items relating to a user such as, but not limited to, instant messaging, email, calendar events, voice mails, appointments, and task items.

In a data communication mode, a received data signal representing information such as a text message, an email message, a media file to be transferred, or Web page download will be processed by the communication subsystem 300 and input to the microprocessor 314, which will further process the signal. In response to the received data signal, the microprocessor 314 may generate output for display on the primary display 202 or the secondary display 104.

For voice communications, the portable electronic device 100 may receive one or more signals associated with a voice communication, such as an indication of the identity of a calling party. In response to the received data signal, the microprocessor 314 may generate output for display on the primary display 202 or the secondary display 104.

In addition, the short-range communications subsystem 326 is an additional optional component which provides for communication between the portable electronic device 100 and different systems or devices, which need not necessarily be similar devices. For example, the short-range communications subsystem 326 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 328 may be a wireless networking communications subsystem, conforming to IEEE 802.11 standards such as one or more of 802.11b, 802.11g, or 802.11n. In response to communication received via the short-range communications subsystem 326, the microprocessor 314 may generate output for display on the primary display 202 or the secondary display 104.

Further, the microprocessor 314 may generate output for display on the primary display 202 or the secondary display 104 in response to an event, such as an alarm, a scheduled user notification or a change in the environment. The microprocessor 314 may also generate output for display on the primary display 202 or the secondary display 104 in response to an event, such as a change in the configuration of the portable electronic device 100.

The portable electronic device 100 may include one or more circuit boards (not shown) that implement the components described above. This disclosure is not limited to any particular electronic component or software module or any combination thereof.

Figure 4:
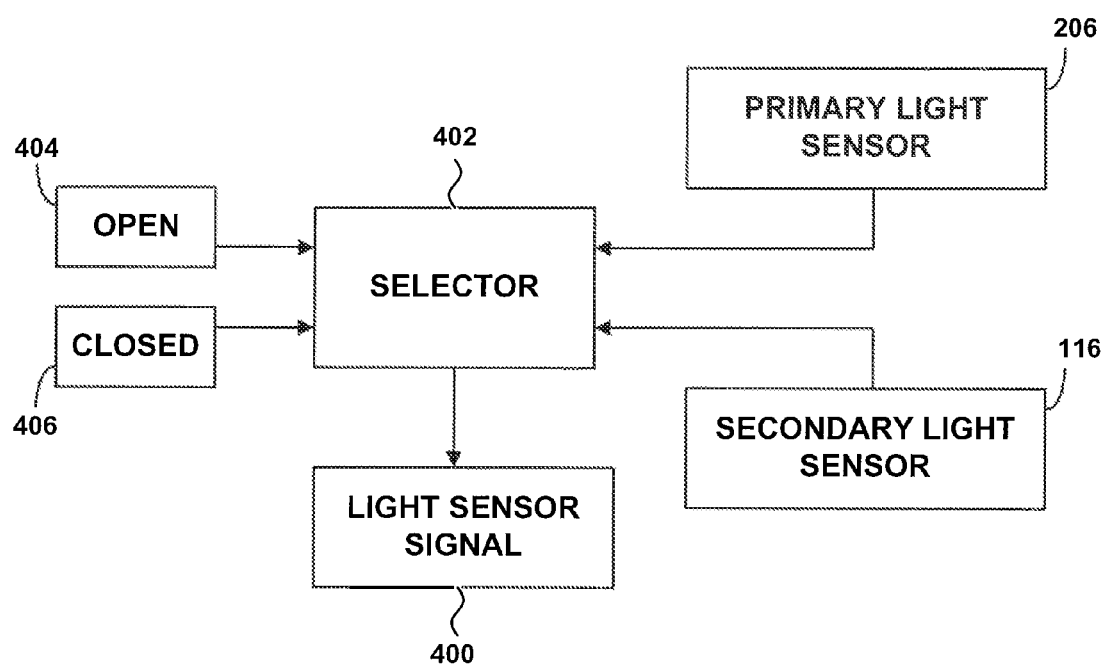
FIG. 4 is a block diagram illustrating selection of a light sensor signal.

FIG. 4 is a block diagram illustrating selection of a light sensor signal as a function of the configuration of the portable electronic device 100. In general, microprocessor 314 uses a light sensor signal 400, and controls primary display 202 or the secondary display 104 as a function of light sensor signal 400. A selector 402 selects whether the light sensor signal 400 to be used by the microprocessor 314 is to come from the primary light sensor 206 or the secondary light sensor 116.

The selector 402 makes the selection based upon the configuration of the portable electronic device 100. When the portable electronic device 100 is in a closed configuration, the selector 402 selects as the light sensor signal 400 the signal generated by the secondary light sensor 116. When the portable electronic device 100 is in an open configuration, the selector 402 selects as the light sensor signal 400 the signal generated by the primary light sensor 206.

In the embodiment depicted in FIG. 4, the selector 400 receives two inputs. A first input 404 is indicative of the portable electronic device 100 being in the open configuration, and a second input 406 is indicative of the portable electronic device 100 being in the closed configuration. It is not necessary to this disclosure that there be separate inputs 404 and 406 indicative of the configuration of the portable electronic device 100. In some embodiments, there may be a single input to the selector 402 that indicates the configuration of the portable electronic device 100.

In one embodiment, the selector 402 comprises a hardware selection element, such as a multiplexer. The multiplexer selects whether the signal from the primary light sensor 206 or the signal from the secondary light sensor 116 will be the light sensor signal 400 to be used by the microprocessor 314, under the control of one or more control inputs 404 and 406 indicative of the configuration of the portable electronic device 100.

The selected light sensor signal 400 is used by microprocessor 314 as the light sensor signal indicative of an ambient light level in the environment. Microprocessor 314 may use the selected light sensor signal 400 to control one or more functions of the portable electronic device 100. Microprocessor 314 may, for example, adjust the brightness of the primary display 202 according to selected light sensor signal 400, or adjust the brightness of the secondary display 104, or set a backlight level for either display, or establish a lighting level for an input or output component, such as the keypad 210. In some embodiments, microprocessor 314 may make these or other adjustments as a function of whether the ambient light, as indicated by the selected light sensor signal, indicates that the user is in a bright environment, a dark environment, or an environment with intermediate lighting.

Figure 5:
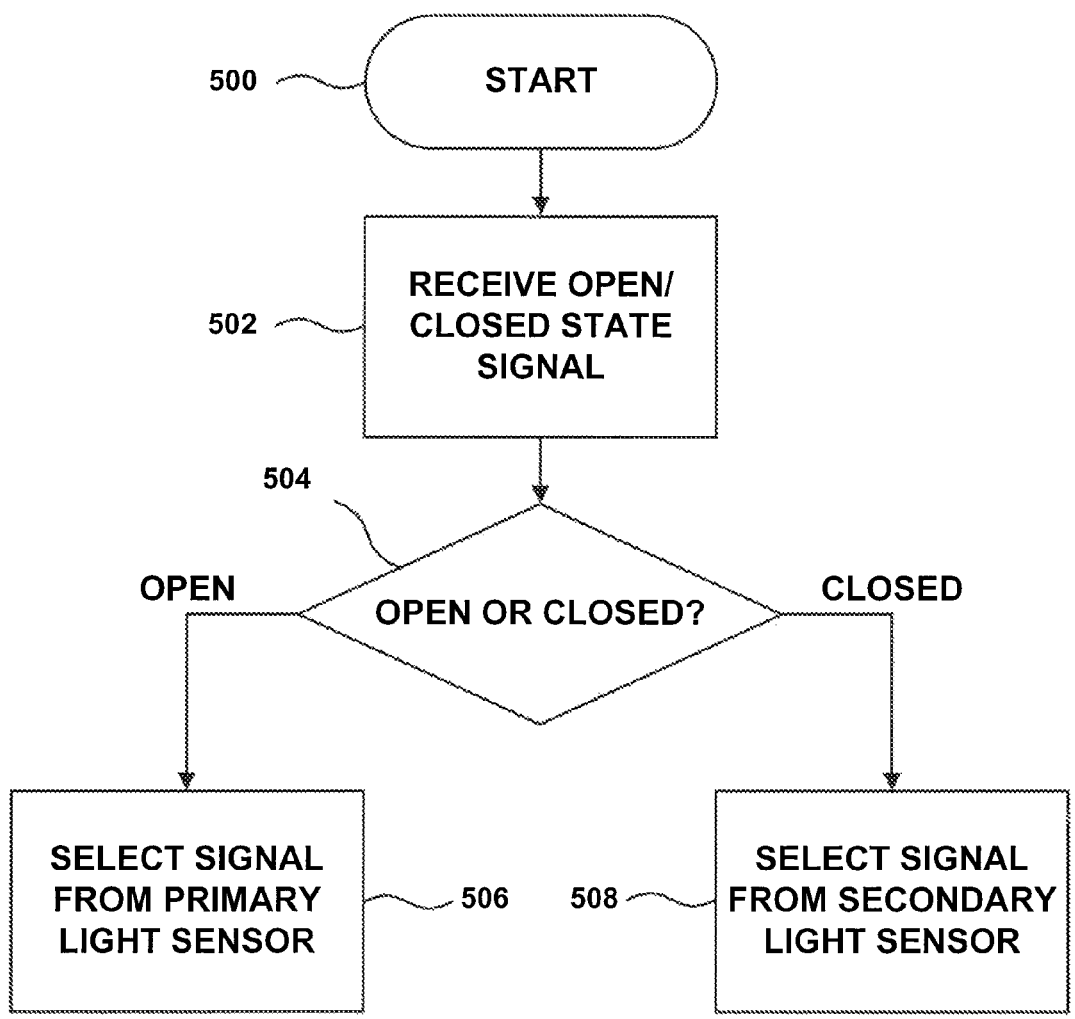
FIG. 5 is a flow diagram illustrating a method carried out by a mobile electronic device.

FIG. 5 is a flow diagram illustrating a process for selecting the selected light sensor signal 400. In the exemplary embodiment described below, operations may be based in hardware or software, but in the particular embodiment, the software running on the microprocessor 314 may carry out one or more steps in the process.

In many cases, there is initiating event that starts the process (500), such as the receipt of a voice message or a signal from the open/closed state detector 304 that the configuration of the portable electronic device 100 has changed. The microprocessor 314 receives a signal from open/closed state detector 304 concerning whether the portable electronic device 100 is in the open configuration or the closed configuration (502). The microprocessor 314 makes a selection (504) as a function of the configuration of the portable electronic device 100. When the portable electronic device 100 is in the open configuration, the microprocessor 314 selects as the selected light sensor signal 400 the light sensor signal from the primary light sensor 206 (506). When the portable electronic device 100 is in the closed configuration, the microprocessor 314 selects as the selected light sensor signal 400 the light sensor signal from the secondary light sensor 116. As described above, one way in which the microprocessor 314 can make this selection is by driving one or more control inputs to a multiplexer, which serves as the selector 402.

The above embodiments may realize one or more potential advantages. For example, the portable electronic device 100 can obtain a more accurate reading of the ambient lighting by selecting a light sensor signal. The light sensor signal from the primary light sensor 206 is more likely to indicate a useful reading of ambient light when the portable electronic device 100 is in the open configuration, and the light sensor signal from the secondary light sensor 116 is more likely to indicate a useful reading of ambient light when the portable electronic device 100 is in the closed configuration. Further, selection of a light sensor signal as a function of configuration may result in a more efficient use of power and may thus prolong battery life.

The above embodiments are for illustration, and although one or more particular embodiments of the device and method have been described herein, changes and modifications may be made thereto without departing from the disclosure in its broadest aspects and as set forth in the following claims.

The invention claimed is:

1. A device comprising:
 an open configuration and a closed configuration, the device configured to alternate between the open configuration and the closed configuration;
 a selector configured to: receive a first input indicative of the device being in the open configuration and a second input indicative of the device being in the closed configuration; select a light sensor signal from one of a primary light sensor and a secondary light sensor as a function of whether the device is in the open configuration or the closed configuration; and, output the light sensor signal.

2. The device of claim 1, wherein the selector is further configured to select the light sensor signal from the primary light sensor responsive to the first input.

3. The device of claim 1, wherein the selector is further configured to select the light sensor signal from the secondary light sensor responsive to the second input.

4. The device of claim 1, wherein the selector comprises a multiplexer.

5. The device of claim 4, wherein the processor is further configured to control the function by at least one of adjusting brightness of a display of the device, setting a backlight level for the display, and establishing a lighting level for one or more of an input component and an output component of the device.

6. The device of claim 1, further comprising a processor in communication with the sensor, the processor configured to control a function of the device in accordance with the light sensor signal.

7. The device of claim 1, further comprising an open-closed state detector, in communication with the selector, the open-closed state detector configured to detect the open configuration and the closed configuration.

8. The device according to claim 1, further comprising: a first casing and a second casing configured to alternate between the open configuration and the closed configuration.

9. The device of claim 8, further comprising an open-closed state detector mounted in one of the first casing and the second casing, the open-closed state detector configured to detect the open configuration and the closed configuration responsive to movement of a magnet in another of the first casing and the second casing.

10. The device of claim 1, further comprising: a first display mounted in one of a first casing and a second casing of the device configured to alternate between the open configuration and the closed configuration, wherein the first display is visible in the open configuration and hidden in the closed configuration; and, a second display mounted in one of the first and second casings.

11. The device of claim 10, further comprising a processor in communication with the sensor, the processor configured to control a function of one or more of the first display and the second display in accordance with the light sensor signal.

12. The device of claim 1, further comprising: one or more of an input component and an output component; and a processor in communication with the sensor, the processor configured to control a function of one or more of the input component and the output component in accordance with the light sensor signal.

13. The device of claim 12, wherein the input component comprises a keyboard and the output component comprises a lamp.

14. The device of claim 12, wherein the input component comprises a lamp, and the lamp and the secondary light sensor are one of either a single element or distinct elements having shared components.

15. The device of claim 12, wherein the output component comprises a lamp and the device further comprises a window in which the primary light sensor and the lamp are disposed such that the window serves as both a visual indicator and a light sensor.

16. A method comprising:
 receiving, at a sensor of a device configured to alternate between an open configuration and a closed configuration, a first input indicative of the device being in an open configuration and a second input indicative of the device being in a closed configuration;
 selecting a light sensor signal from one of a primary light sensor and a secondary light sensor as a function of the device being in the open configuration or the closed configuration; and,
 outputting the light sensor signal.

17. The method of claim 16, wherein the selecting comprises selecting the light sensor signal from the primary light sensor responsive to the first input.

18. The method of claim 17, wherein the controlling a function comprises at least one of adjusting brightness of a display, setting a backlight level for the display, and establishing a lighting level for one or more of an input component and an output component of the device.

19. The method of claim 16, wherein the selecting comprises selecting the light sensor signal from the secondary light sensor responsive to the second input.

20. The method of claim 16, further comprising controlling a function of the device in accordance with the light sensor signal.

* * * * *